United States Patent
Bhatnagar et al.

(10) Patent No.: US 7,629,277 B2
(45) Date of Patent: *Dec. 8, 2009

(54) FRAG SHIELD

(75) Inventors: Ashok Bhatnagar, Richmond, VA (US); Lori L. Wagner, Richmond, VA (US); Chok Bin C. Tan, Richmond, VA (US); Brian Arvidson, Chester, VA (US); Harold Lindley Murray, Jr., North East, MD (US); David Hurst, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/285,817

(22) Filed: Nov. 23, 2005

(65) Prior Publication Data

US 2007/0117483 A1  May 24, 2007

(51) Int. Cl.
*B32B 27/04* (2006.01)
*B32B 27/40* (2006.01)
*B32B 5/12* (2006.01)
*B32B 37/02* (2006.01)
*F41H 1/02* (2006.01)

(52) U.S. Cl. .................... 442/366; 442/134; 442/135; 442/164; 442/169; 442/381; 442/392; 442/394; 442/398; 442/414; 428/105; 428/109; 428/114; 428/911; 428/912; 156/60

(58) Field of Classification Search ............... 442/164, 442/169, 134, 135, 366, 394, 398, 414; 428/911, 428/912
See application file for complete search history.

(56) References Cited

U.S. PATENT DOCUMENTS

| 4,403,012 A | * | 9/1983 | Harpell et al. ............. 442/135 |
| 4,623,574 A | | 11/1986 | Harpell et al. ............. 428/113 |
| 4,650,710 A | | 3/1987 | Harpell et al. ............. 428/263 |
| 4,748,064 A | | 5/1988 | Harpell et al. ............. 428/113 |
| 5,552,208 A | | 9/1996 | Lin et al. .................... 428/113 |
| 5,587,230 A | | 12/1996 | Lin et al. .................... 428/245 |
| 5,677,029 A | | 10/1997 | Prevorsek et al. .......... 428/113 |
| 5,935,678 A | | 8/1999 | Park ........................... 428/105 |
| 6,238,768 B1 | | 5/2001 | Van de Goot ............... 428/113 |
| 6,642,159 B1 | | 11/2003 | Bhatnagar et al. .......... 442/134 |
| 6,764,764 B1 | | 7/2004 | Tam et al. ................... 428/375 |
| 6,841,492 B2 | | 1/2005 | Bhatnagar et al. .......... 442/135 |
| 6,846,758 B2 | | 1/2005 | Bhatnagar et al. .......... 442/135 |
| 2002/0034624 A1 | * | 3/2002 | Harpell et al. ............. 428/298.1 |
| 2002/0037391 A1 | | 3/2002 | Harpell et al. |
| 2003/0199215 A1 | * | 10/2003 | Bhatnagar et al. .......... 442/135 |
| 2004/0092183 A1 | | 5/2004 | Geva et al. |

FOREIGN PATENT DOCUMENTS

EP 0768507 4/1997
WO WO-02/101319 A 12/2002

* cited by examiner

*Primary Examiner*—Jennifer A Chriss
(74) *Attorney, Agent, or Firm*—Erika S. Wilson

(57) ABSTRACT

Fabric laminates having superior resistance to penetration of fragments, such as shrapnel. The fabrics are formed of high-strength fibers consolidated with from about 7% to about 15% by weight of an elastomeric matrix composition, and in combination with protective layers of a polymer film on each surface of the fabric. The fabrics achieve a significant improvement in fragment resistance compared to fabrics of the prior art, while also maintaining excellent ballistic resistant properties.

31 Claims, No Drawings

FRAG SHIELD

BACKGROUND OF THE INVENTION

1. Field of the Invention

This invention relates to fabric laminates having excellent ballistic resistant properties as well as superior resistance to penetration of fragments, such as shrapnel. More particularly, the invention pertains to a light-weight, flexible, non-woven, fragment and ballistic resistant material formed from high-strength polymeric fibers in an elastomeric matrix.

2. Description of the Related Art

Ballistic resistant articles containing high strength fibers that have excellent properties against deformable projectiles are known. Articles such as bulletproof vests, helmets and structural members of military equipment, are typically made from fabrics comprising such high strength fibers. Fibers conventionally used include polyethylene fibers, para-aramid fibers such as poly(phenylenediamine terephthalamide), graphite fibers, nylon fibers, glass fibers and the like. For many applications, such as vests or parts of vests, the fibers may be used in a woven or knitted fabric. For many of the other applications, the fibers are encapsulated or embedded in a composite material to form either rigid or flexible fabrics.

Various ballistic resistant constructions are known that are useful for the formation of articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

U.S. Pat. Nos. 4,403,012 and 4,457,985 disclose ballistic-resistant composite articles comprised of networks of high molecular weight polyethylene or polypropylene fibers, and matrices composed of olefin polymers and copolymers, unsaturated polyesters, epoxies, and other polymers moldable below the melting point of the fiber. U.S. Pat. Nos. 4,623,574 and 4,748,064 disclose simple composite structures comprising high strength fibers embedded in an elastomeric matrix. U.S. Pat. Nos. 4,737,402 and 4,613,535 disclose complex rigid composite articles having good impact resistance which comprise a network of high strength fibers such as the ultra-high molecular weight polyethylene and polypropylene disclosed in U.S. Pat. No. 4,413,110, also incorporated herein by reference, embedded in an elastomeric matrix material and at least one additional rigid layer on a major surface of the fibers in the matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material.

U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers therebetween. The composite is bonded to a hard plate to increase protection against armor piercing projectiles. U.S. Pat. No. 6,841,492 discloses bi-directional and multi-axial fabrics, fabric composites, ballistically resistant assemblies thereof and the methods by which they are made. The fabrics are comprised of sets of strong, substantially parallel, unidirectional yarns lying in parallel planes, one above the other. U.S. Pat. No. 6,846,758 discloses woven fabric laminates having superior resistance to penetration by ballistic projectiles. Laminates of the invention are comprised of a fabric woven from a high strength, high modulus yarn, a surface coating of a low modulus elastomer and a plastic film bonded to its elastomer-coated surface.

One problem associated with the current ballistic resistant fabrics and articles is their limited resistance to the penetration of fragments, such as shrapnel. The present invention provides a solution to this problem. It has been unexpectedly found that a non-woven fabric formed from a consolidated network of high-strength fibers consolidated with from about 7% to about 15% by weight of an elastomeric matrix composition, and in combination with protective layers of a polymer film on each surface of the fabric, achieves a significant improvement in fragment resistance compared to fabrics of the prior art, while also maintaining excellent properties against deformable projectiles.

SUMMARY OF THE INVENTION

The invention provides a fragment resistant material comprising:

a) at least one consolidated network of fibers, said consolidated network of fibers comprising a plurality of cross-plied, non-woven fiber layers, each fiber layer comprising a plurality of fibers arranged in a substantially parallel array; said fibers having a tenacity of about 7 g/denier or more and a tensile modulus of about 150 g/denier or more; said fibers having an elastomeric matrix composition thereon, said elastomeric matrix composition comprising from about 7% to about 15% by weight of said consolidated network of fibers; the plurality of cross-plied, non-woven fiber layers being consolidated with said matrix composition to form said consolidated network of fibers; said consolidated network of fibers having anterior and posterior surfaces; wherein if said fibers comprise aramid fibers or poly(p-phenylenebenzobisoxazole) fibers, said matrix composition comprises at least about 11% by weight of said consolidated network of fibers; and b) at least one layer of a polymer film attached to each of said anterior and posterior surfaces of said consolidated network of fibers.

The invention also provides a fragment resistant article incorporating a fragment resistant material, which fragment resistant material comprises:

a) at least one consolidated network of fibers, said consolidated network of fibers comprising a plurality of cross-plied, non-woven fiber layers, each fiber layer comprising a plurality of fibers arranged in a substantially parallel array; said fibers having a tenacity of about 7 g/denier or more and a tensile modulus of about 150 g/denier or more; said fibers having an elastomeric matrix composition thereon, said elastomeric matrix composition comprising from about 7% to about 15% by weight of said consolidated network of fibers; the plurality of cross-plied, non-woven fiber layers being consolidated with said matrix composition to form said consolidated network of fibers; said consolidated network of fibers having anterior and posterior surfaces; wherein if said fibers comprise aramid fibers or poly(p-phenylenebenzobisoxazole) fibers, said matrix composition comprises at least about 11% by weight of said consolidated network of fibers; and b) at least one layer of a polymer film attached to each of said anterior and posterior surfaces of said consolidated network of fibers.

The invention further provides a method of producing a fragment resistant material comprising:
  a) forming at least two fiber layers, each fiber layer being formed by arranging a plurality of fibers into a substantially parallel, unidirectional array; said fibers having a tenacity of about 7 g/denier or more and a tensile modulus of about 150 g/denier or more; said fibers having an elastomeric matrix composition applied thereon;
  b) arranging said fiber layers wherein the unidirectional array of fibers of each layer are cross-plied at a nonparallel angle relative to the longitudinal fiber direction of each adjacent layer;
  c) bonding said cross-plied layers under conditions sufficient to form a consolidated network of fibers, the consolidated network of fibers having anterior and posterior surfaces; wherein said matrix composition comprises from about 7% to about 15% by weight of said consolidated network of fibers, and wherein if said fibers comprise aramid fibers or poly(p-phenylenebenzobisoxazole) fibers, said matrix composition comprises at least about 11% by weight of said consolidated network of fibers; and
  d) attaching at least one layer of a polymer film to each of said anterior and posterior surfaces of said consolidated network of fibers.

The invention still further provides a fragment resistant material comprising:
  a) at least one consolidated network of fibers, said consolidated network of fibers comprising a plurality of cross-plied fiber layers, each fiber layer comprising a plurality of fibers arranged in an array; said fibers having a tenacity of about 7 g/denier or more and a tensile modulus of about 150 g/denier or more; said fibers having an elastomeric matrix composition thereon, said elastomeric matrix composition comprising from about 7% to about 15% by weight of said consolidated network of fibers; the plurality of cross-plied fiber layers being consolidated with said matrix composition to form said consolidated network of fibers; said consolidated network of fibers having anterior and posterior surfaces; and
  b) at least one layer of a polymer film attached to each of said anterior and posterior surfaces of said consolidated network of fibers.

DETAILED DESCRIPTION OF THE INVENTION

The invention presents non-woven fabric composites having superior fragment penetration resistance in addition to superior ballistic penetration resistance. For the purposes of the invention, fragment resistant materials of the invention that have superior ballistic penetration resistance describe those which exhibit excellent properties against deformable projectiles.

The fibers of the invention are preferably coated with a low modulus elastomeric material where the matrix comprises from about 7 to about 15% by weight of the fabric. The fabric further comprises at least one outer polymer layer attached each outer surface of the consolidated network. As used herein throughout, the term tensile modulus means the modulus of elasticity as measured by ASTM 2256 testing procedures for a fiber and by ASTM D638 testing procedures for the elastomeric matrix material.

For the purposes of the present invention, a fiber is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

The fragment resistant materials of the invention comprise at least one consolidated network of high-strength, high tensile modulus fibers that have an elastomeric matrix thereon, wherein one consolidated network is a "single layer" fabric structure comprising more than one fiber layer. As used herein, a fiber "network" denotes a plurality of arranged or interconnected fiber or yarn layers. A "consolidated network" describes a consolidated combination of fiber layers with a matrix composition. As used herein, a "single layer" structure refers to structure composed of one or more individual fiber layers that have been consolidated into a single unitary structure. In general, a "fabric" may relate to either a woven or non-woven material. In the preferred embodiments of the invention, the fragment resistant fabrics are non-woven materials. An "array" describes a orderly parallel arrangement of fibers or yarns. A fiber "layer" describes a planar arrangement of woven or non-woven fibers or yarns. A fiber network can have various configurations. For example, the fibers may be formed as a felt or another woven, non-woven or knitted, or formed into a network by any other conventional technique. According to a particularly preferred consolidated network configuration, a plurality of fiber layers are combined whereby each fiber layer comprises fibers unidirectionally aligned in an array so that they are substantially parallel to each other along a common longitudinal fiber direction.

As used herein, a "high-strength, high tensile modulus fiber" is one which has a preferred tenacity of at least about 7 g/denier or more, a preferred tensile modulus of at least about 150 g/denier or more, and a preferred energy-to-break of at least about 8 J/g or more, each as measured by ASTM D2256 testing procedures. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstrained specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include extended chain polyolefin fibers, such as highly oriented, high molecular weight polyethylene fibers, particularly ultra-high molecular weight polyethylene fibers, and ultra-high molecular weight polypropylene fibers. Also suitable are extended chain polyvinyl alcohol fibers, extended chain polyacrylonitrile fibers, para-aramid fibers, polybenzazole fibers, such as polybenzoxazole (PBO) and polybenzothiazole (PBT) fibers and liquid crystal copolyester fibers.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference.

The most preferred polyethylene fibers for use in the invention are polyethylene fibers sold under the trademark Spectra® from Honeywell International Inc. Spectra® fibers are well known in the art. Ounce for ounce, Spectra® high performance fiber is ten times stronger than steel, while also light enough to float on water. The fibers also possess other key properties, including resistance to impact, moisture, abrasion chemicals and puncture. These fibers are preferably produced using a process known as gel-spinning. In this process, extended-chain polyethylene molecules are dissolved in a solvent which is heated and forced through tiny nozzles called spinnerets. The resulting jets of solution cool and harden into polymeric fibers which are then drawn, dried and wound onto spools for further manufacturing. Such techniques are well known in the art. This process aligns the extended-chain polyethylene molecules so that the hydrogen atoms of each molecule bond with those of its neighbors. This high degree of carbon-carbon molecular bonding within the fiber gives the Spectra® fibers great tensile strength. Spectra® fibers in and of themselves have been known for quite some time and are described, for example, in commonly owned U.S. Pat. Nos. 4,623,547 and 4,748,064 to Harpell, et al.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types are conventionally known and are widely commercially available.

Suitable aramid (aromatic polyamide) fibers are commercially available and are described, for example, in U.S. Pat. No. 3,671,542. For example, useful poly(p-phenylene terephyhalamide) filaments are produced commercially by Dupont corporation under the trade name of KEVLAR®. Also useful in the practice of this invention are poly(m-phenylene isophthalamide) fibers produced commercially by Dupont under the trade name NOMEX®. Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which are incorporated herein by reference.

The other suitable fiber types for use in the present invention include glass fibers, fibers formed from carbon, fibers formed from basalt or other minerals, M5® fibers and combinations of all the above materials, all of which are commercially available. M5® fibers are manufactured by Magellan Systems International of Richmond, Va. and are described, for example, in U.S. Pat. Nos. 5,674,969, 5,939,553, 5,945,537, and 6,040,478, each of which are incorporated herein by reference. Specifically preferred fibers include M5® fibers, polyethylene Spectra® fibers, poly(p-phenylene terephthalamide) and poly(p-phenylene-2,6-benzobisoxazole) fibers. Most preferably, the fibers comprise high strength, high modulus polyethylene Spectra® fibers.

The most preferred fibers for the purposes of the invention are high-strength, high tensile modulus extended chain polyethylene fibers. As stated above, a high-strength, high tensile modulus fiber is one which has a preferred tenacity of about 7 g/denier or more, a preferred tensile modulus of about 150 g/denier or more as measured by ASTM D2256 and a preferred energy-to-break of about 8 J/g or more. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more. These combined high strength properties are obtainable by employing solution grown or gel fiber processes. U.S. Pat. Nos. 4,413,110, 4,440,711, 4,535,027, 4,457,985, 4,623,547 4,650,710 and 4,748,064 generally discuss the preferred high strength, extended chain polyethylene fibers employed in the present invention, and the disclosures of these patents are hereby incorporated by reference.

A preferred technique of forming the fabrics of the invention is to coat at least one surface of the fibers with an elastomeric composition, preferably substantially coating or encapsulating each of the individual fibers, followed by pressing together and fusing a plurality of such coated fibers. This elastomer composition is hereby referred to herein as a matrix composition. The term "matrix" as used herein is well known in the art, and is used to represent a polymeric material that binds the fibers together after consolidation. The term "composite" refers to consolidated combinations of fibers with the matrix material. In the preferred embodiment of the invention, the fibers of the invention are first coated with the elastomeric matrix composition followed by arranging a plurality of fibers into a non-woven fiber layer. Alternately, the fibers may be arranged together and subsequently coated with the elastomeric matrix composition.

The elastomeric matrix composition may comprise a variety of polymeric and non-polymeric materials. The preferred elastomeric matrix composition comprises a low modulus elastomeric material. For the purposes of this invention, a low modulus elastomeric material has a tensile modulus, measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has an preferred elongation to break of at least about 50%, more preferably at least about 100% and most preferably has an elongation to break of at least about 300%.

A wide variety of elastomeric materials and formulations may be utilized in this invention. Representative examples of suitable elastomers have their structures, properties, formulations together with crosslinking procedures summarized in the Encyclopedia of Polymer Science, Volume 5 in the section Elastomers-Synthetic (John Wiley & Sons Inc., 1964). The essential requirement is that the matrix materials of this invention have appropriately low moduli and are moldable below the melting point of the fiber. Suitable low modulus elastomeric materials include polybutadiene, polyisoprene, natural rubber, polyethylene, cross-linked polyethylene, chlorosulfonated polyethylene, polypropylene, ethylene copolymers, propylene copolymers, ethylene-propylene copolymers, ethylene-propylene-diene terpolymers, polysulfide polymers, polyurethane elastomers, epoxies, polychloroprene, plasticized polyvinylchloride, butadiene acrylonitrile elastomers, poly(isobutylene-co-isoprene), polyacrylates, phenolics, polybutyrals, polyesters, polyethers, fluoroelastomers, silicone elastomers, thermoplastic elastomers and styrenic block copolymers, such as styrene-isoprene-styrene or styrene-butadiene-styrene types, and the like.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R—(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton® Thermoplastic Rubber", SC-68-81. The most preferred matrix polymer comprises styrenic block copolymers sold under the trademark Kraton® commercially produced by Kraton Polymers.

Most preferably, the low modulus elastomeric material consists essentially of at least one of the above-mentioned elastomers. The low modulus elastomeric materials may also include fillers such as carbon black, silica, etc. and may be extended with oils and vulcanized by sulfur, peroxide, metal oxide, or radiation cure systems using methods well known to rubber technologists. Blends of different elastomeric materials may be used together or one or more elastomer materials may be blended with one or more thermoplastics. High density, low density, and linear low density polyethylene may be cross-linked to obtain a coating matrix material of appropriate properties, either alone or as blends. In every instance, the modulus of the coating should not exceed 6,000 psi (41.4 MPa) as measured by ASTM D638 testing procedures.

The coating may be applied to the fiber in a variety of ways, such as by spraying or roll coating a solution of the elastomer onto fiber surfaces, followed by drying. One method is to apply a neat coating material to fibers either as a liquid, a sticky solid or particles in suspension or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using the gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fiber may be extruded into a fluidized bed of the appropriate polymeric powder. Furthermore, if a stretching operation or other manipulative process, e.g. solvent exchanging, drying or the like, is conducted, the coating may be applied to a precursor material of the final fiber.

In another coating technique, a layer of fibers is first formed, followed by dipping the layer into a bath of a solution containing the low modulus elastomeric coating material. Evaporation of the solvent produces an elastomeric material coated fiber network. The dipping procedure may be repeated several times as required to place a desired amount of elastomeric material coating on the fibers.

The proportion of dry matrix composition to the overall fabric is relatively low, preferably from about 7% to about 15% by weight based on the overall weight of the fabric. More preferably, the dry matrix composition comprises from about 11% to about 15% by weight of the fabric. More preferably, the dry matrix composition comprises from about 7% to about 14% by weight of the fabric, more preferably from about 7% to about 13%, more preferably from about 7% to about 12% and more preferably from about 7% to about 11% by weight of the fabric. It has been unexpectedly found that a reduction of the overall matrix content in the fabric in combination with the outer polymeric film layers on the fabric results in a fabric having superior fragment resistance in addition to superior ballistic resistance. If said fibers comprise aramid fibers or poly(p-phenylenebenzobisoxazole) fibers, the matrix composition preferably comprises at least about 11% by weight of said consolidated network of fibers.

In a preferred embodiment of the invention, the fibers of the invention are first coated using one of the above techniques, followed by arranging a plurality of fibers into a non-woven fiber layer. Preferably, individual fibers are positioned next to and in contact with each other and are arranged into sheet-like arrays of fibers in which the fibers are aligned substantially parallel to one another along a common longitudinal fiber direction. In a particularly effective technique for arranging the fibers into such a configuration, the fibers are pulled through a bath containing a solution of the elastomeric material, and are then helically wound into a single sheet-like layer around and along the length of a suitable form, such as a cylinder. The solvent is then evaporated leaving a pre-preg sheet of parallel arranged fibers that can be removed from the cylindrical form and cut to a desired size. Alternatively, a plurality of fibers can be simultaneously pulled through the bath of elastomer solution and laid down in closely positioned, substantially parallel relation to one another on a suitable surface. Evaporation of the solvent leaves a pre-preg sheet comprised of elastomer coated fibers which are substantially parallel and aligned along a common fiber direction.

The above methods are preferably followed to form at least two unidirectional fiber layers whereby the fibers are substantially coated with a low modulus elastomeric matrix composition on all fiber surfaces. Thereafter, the fiber layers are preferably consolidated into a single-layer consolidated fiber network. This may be achieved by stacking the individual fiber layers one on top of another, followed by bonding them together under heat and pressure to heat setting the overall structure, causing the matrix material to flow and occupy any remaining void spaces. As is conventionally known in the art, excellent ballistic resistance is achieved when individual fiber layer are cross-plied such that the fiber alignment direction of one layer is rotated at an angle with respect to the fiber alignment direction of another layer, such that they are non-parallel. For example, a preferred structure has two fiber layers of the invention positioned together such that the longitudinal fiber direction of one layer is perpendicular to the longitudinal fiber direction of the other layer. In another example, a five layered structure is formed in which the second, third, fourth and fifth layers are rotated +45°, −45°, 90° and 0°, with respect to the first layer, but not necessarily in that order. For the purposes of this invention, adjacent layers may be aligned at virtually any angle between about 0° and about 90° with respect to the longitudinal fiber direction of another layer, but the about 0° and about 90° fiber orientations are preferred. While the examples above illustrate fabrics that include either two or five individual fiber layers, such is not intended to be limiting. It should be understood that the single-layer consolidated networks of the invention may generally include any number of cross-plied layers, such as about 20 to about 40 or more layers as may be desired for various applications.

Suitable bonding conditions for consolidating the fiber layers and attaching the polymer film layers include conventionally known lamination techniques. A typical lamination process includes pressing the polymer films on the cross-plied material at about 110° C., under about 200 psi (1379 kPa) pressure for about 30 minutes. The consolidation of the individual fibers layers of the invention is preferably conducted at a temperature of from about 200° F. (~93° C.) to about 350° F. (~177° C.), more preferably at a temperature of from about 200° F. to about 300° F. (~149° C.) and most preferably at a temperature of from about 200° F. to about 250° F. (~121° C.), and at a pressure of from about 25 psi (~172 kPa) to about 500 psi (3447 kPa) or higher. The consolidation may be conducted in an autoclave, as is conventionally known in the art.

When heating, it is possible that the matrix can be caused to stick or flow without completely melting. However, generally, if the matrix material is caused to melt, relatively little pressure is required to form the composite, while if the matrix material is only heated to a sticking point, more pressure is typically required. The consolidation step may generally take from about 10 seconds to about 24 hours. However, the lamination temperatures, pressures and times are generally dependent on the type of matrix polymer, matrix polymer content and type of fiber.

Following the consolidation of the fiber layers, a polymer layer is preferably attached to each of the anterior and posterior surfaces of the single-layer, consolidated network via conventional methods. Suitable polymers for said polymer layer non-exclusively include thermoplastic and thermosetting polymers. Suitable thermoplastic polymers non-exclusively may be selected from the group consisting of polyolefins, polyamides, polyesters, polyurethanes, vinyl polymers, fluoropolymers and co-polymers and mixtures thereof. Of these, polyolefin layers are preferred. The preferred polyolefin is a polyethylene. Non-limiting examples of polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred polyethylene is LLDPE. Suitable thermosetting polymers non-exclusively include thermoset allyls, aminos, cyanates, epoxies, phenolics, unsaturated polyesters, bismaleimides, rigid polyurethanes, silicones, vinyl esters and their copolymers and blends, such as those described in U.S. Pat. Nos. 6,846,758, 6,841,492 and 6,642,159. As described herein, a polymer film includes polymer coatings.

The polymer film layers are preferably attached to the single-layer, consolidated network using well known lamination techniques. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rollers by techniques well known in the art. Lamination heating may be done at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. In the preferred embodiment of the invention, the polymer film layers preferably comprise from about 2% to about 25% by weight of the overall fabric, more preferably from about 2% to about 17% percent by weight of the overall fabric and most preferably from 2% to 12%. The percent by weight of the polymer film layers will generally vary depending on the number of fabric layers forming the multilayered film. While the consolidation and outer polymer layer lamination steps are described herein as two separate steps, they may alternately be combined into a single consolidation/lamination step via conventional techniques in the art.

The polymer film layers are preferably very thin, having preferred layer thicknesses of from about 1 μm to about 250 μm, more preferably from about 5 μm to about 25 μm and most preferably from about 5 μm to about 9 μm. The thickness of the individual fabric layers will correspond to the thickness of the individual fibers. Accordingly, preferred single-layer, consolidated networks of the invention will have a preferred thickness of from about 25 μm to about 500 μm, more preferably from about 75 μm to about 385 μm and most preferably from about 125 μm to about 255 μm. While such thicknesses are preferred, it is to be understood that other film thicknesses may be produced to satisfy a particular need and yet fall within the scope of the present invention.

The fabrics of the invention also exhibit good peel strength. Peel strength is an indicator of bond strength between fiber layers. As a general rule, the lower the matrix polymer content, the lower the bond strength, but the higher the fragment resistance. However, below a critical bond strength, the ballistic material loses durability during material cutting and assembly of articles, such as a vest, and also results in reduced long term durability of the articles. In the preferred embodiment, the peel strength for SPECTRA® fiber materials in a SPECTRA® Shield (0°,90°) configuration is preferably at least about 0.17 lb/ft$^2$ for good fragment resistance, more preferably at least about 0.188 lb/ft$^2$, and more preferably at least about 0.206 lb/ft$^2$. It has been found that the best peel strengths are achieved for fabrics of the invention having at least about 11% to about 15% matrix content, particularly for aramid and poly(p-phenylenebenzobisoxazole) fibers.

After formation of the fabrics, they may be used in various applications. For example, they may be molded into articles by subjecting them to heat and pressure. Temperatures for molding may range from about 20° C. to about 175° C., preferably from about 100° C. to about 150° C., more preferably from about 110° C. to about 130° C. Also suitable are the techniques suitable for forming articles described in, for example, U.S. Pat. Nos. 4,623,574, 4,650,710, 4,748,064, 5,552,208, 5,587,230, 6,642,159, 6,841,492 and 6,846,758.

In a preferred embodiment of the present invention, a plurality of single-layer, consolidated fiber networks are arranged together to form flexible articles, including garments such as vests, pants, hats, or other articles of clothing, as is well known in the art. The fabrics of the invention may also be formed into other personal protective articles such as helmets, or may be formed into protective shields, covers or blankets as desired. The fiber networks may individually retain the high flexibility characteristic of textile fabrics and preferably remain separate from each other, i.e. not being bonded together. Alternately, multiple layers of fabric may be stitched together or bonded together with adhesive materials or other thermoplastic or non-thermoplastic fibers or materials. Accordingly, articles of the invention may comprise a plurality of non-woven, fragment resistant fabrics that are assembled into a bonded or non-bonded array.

Garments of the invention may be formed through methods conventionally known in the art. Preferably, a garment may be formed by adjoining the fragment resistant fabrics of the invention with an article of clothing. For example, a fragment resistant vest may comprise a generic fabric vest that is adjoined with the fragment resistant fabrics of the invention, whereby the inventive fabrics are inserted into strategically placed pockets. This allows for the maximization of fragment and ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the fragment resistant fabrics may optionally be easily removable from the vest or other article of clothing.

Vests and other articles of clothing comprised of multiple layers of fabric constructed in accordance with the present invention have good flexibility and comfort coupled with excellent ballistic protection and fragment resistance. A small pointed projectile can penetrate armor by laterally displacing fibers without breaking them. In this case, the penetration resistance depends on how readily fibers may be pushed aside, and therefore, on the nature of the fiber network. An important factor in the ballistic or fragment resistance of a non-woven fabric is the periodicity of cross-overs in cross-plied unidirectional composites and fiber denier, fiber-to-fiber friction, matrix characteristics, inter-laminar bond strengths and others.

Sharp fragments can penetrate by shearing fibers. Projectiles may also break fibers in tension. The impact of a projectile on a fabric causes propagation of a strain wave through the fabric. Ballistic resistance is greater if the strain wave can propagate rapidly and unimpeded through the fabric and involve greater volumes of fiber. Lower interfacial bond between layers of the embodiment allow higher energy absorption. Experimental and analytical work has shown that in all actual cases, all penetration modes exist and that their relative importance is greatly affected by the design of the composite.

The ballistic and fragment resistance properties are determined using standard testing procedures that are well known in the art. For example, screening studies of ballistic composites commonly employ a .22 caliber, non-deforming steel fragment of specified weight, hardness and dimensions (Mil-Spec.MIL-P-46593A(ORD)).

The protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of the article is the resistance to penetration by a designated threat, such as physical objects including bullets, fragments, shrapnels and the like, and non-physical objects, such as a blast from explosion. For composites of equal areal density, which is the weight of the composite panel divided by the surface area, the higher the $V_{50}$, the better the resistance of the composite. The penetration resistance for designated threats can also be expressed by the total specific energy absorption ("SEAT") of the ballistic resistant material. The total SEAT is the kinetic energy of the threat divided by the areal density of the composite. The higher the SEAT value, the better the resistance of the composite to the threat.

The ballistic and fragment properties of the fabrics of the invention will vary depending on many factors, particularly the type of fibers used to manufacture the fabrics. However, it has been unexpectedly discovered that the fabrics of the invention have improved $V_{50}$ values and improved specific energy absorption of the target compared to similar fabrics having greater quantities of matrix polymer, as can be seen in the examples and data table below.

The following non-limiting examples serve to illustrate the invention.

EXAMPLES

Example 1 (Comparative)

A ballistic shoot pack was prepared by stacking together 18 fabric layers, each fabric layer being comprised of a consolidated network having two sheets (plies) of unidirectional, high modulus polyethylene (HMPE) fibers impregnated with Kraton® thermoplastic polymer, each layer being cross-plied at right angles to each other (0 degrees/90 degrees) and laminated between two sheets of linear low density polyethylene (LLDPE) film.

The HMPE fibers were SPECTRA® 1000, 1100 denier, manufactured by Honeywell International, Inc. and had a tenacity of 36 g/denier and a tensile modulus of 1250 g/denier. The Kraton® polymer used was a polystyrene-polyisoprene-polystrene-block copolymer. Each fabric layer, prior to the polyethylene films being added, comprised 79% by weight of the fiber and 21% by weight of the Kraton® polymer based on the total weight the fabric, The LLDPE films each had a thickness of 9 μm. The areal density of each LLDPE film was 8 gsm (gram/m$^2$). The LLDPE films were laminated to the cross-plied material at 110° C., about 200 psi (1379 kPa) pressure for at least 30 minutes. The total areal density of one fabric layer was 116 gsm. A continuous laminated sheet of material was formed and wound into a roll. The laminated sheet had a thickness of 0.006" (0.1524 mm). The sheet was then cut to form 18 separate layers, each having a length and width of 18"×18" (45.7 mm×45.7 mm). The 18 layers were then loosely stacked together to form a shoot pack. The layers were not bonded to each other. The areal density of the shoot pack was 0.43 lb/ft$^2$ (2.09 kg/m$^2$).

For testing against fragment resistance, the shoot pack was mounted on a test frame and firmly clamped at the top of the frame. The frame was mounted at a 90-degree orientation to the line of fragment fired from a firmly mounted universal receiver. A 17 grain Fragment Simulating Projectile (FSP) was used for testing and conformed to the shape, size and weight as per the MIL-P-46593A. $V_{50}$ Ballistic testing was conducted in accordance with the procedures of MIL-STD-662F. $V_{50}$ ballistic limit testing is a statistical test that experimentally identifies the velocity at which a bullet has a 50 percent chance of penetrating the test object.

Several 17 grain FSP fragments were fired, changing the velocity of each fragment. The velocity of each fragment was moved down and up depending whether the previous fragment shot was a complete penetration or partially penetrated a few layers of the shoot pack. An average velocity was achieved by preferably including about four partial penetrations and about four complete fragment penetrations within a velocity range of about 125 feet per second (fps).

The average velocity of the partial and complete penetrations is called the $V_{50}$. The $V_{50}$ of this shoot pack was tested as 1201 fps. The Specific Energy Absorption of the Target (SEAT) was calculated as 34.88 J-m$^2$/kg.

Example 1A (Comparative)

Example 1 is repeated, but with a shoot pack having 19 stacked fabric layers having an areal density of 0.44 lb/ft$^2$ (2.15 kg/m$^2$). The $V_{50}$ of this shoot pack was tested as 1217 fps. The Specific Energy Absorption of the Target (SEAT) was calculated as 35.01 J-m$^2$/kg.

Example 2

A ballistic shoot pack was prepared by stacking together 20 fabric layers of SPECTRAL® 1000, 1100 denier as described in Example 1. Each fabric layer comprised 88.7% by weight of fiber based on the weight the fabric layer, and comprised 11.3% by weight of matrix polymer based on the weight the fabric layer. The LLDPE film had a thickness of 9 µm. The areal density of LLDPE film was 8 gsm. The total areal density of one fabric layer was 103.9 gsm. The laminated sheets of material had a thickness of 0.1524 mm.

The size of the shoot pack was 18"×18" (45.7 mm×45.7 mm). The stacks of sheets were not connected with each other. The areal density of the shoot pack was 0.43 lb/ft$^2$ (2.09 kg/m$^2$). The pack was tested for fragment resistance as in Example 1. The $V_{50}$ of this shoot pack was tested as 1412 fps. The Specific Energy Absorption of the Target (SEAT) was calculated as 48.2 J-m$^2$/kg. This example illustrates the superior fragment resistant properties achieved with SPECTRA® 1000, 1100 denier fabric having 11% matrix polymer compared to 21% as in Example 1.

Example 3 (Comparative)

Example 1 was repeated, only the shoot pack included 32 fabric layers and was tested against a 9 mm Full Metal Jacket (FMJ) bullet. The size of the shoot pack was 18"×18" (45.7 mm×45.7 mm). The areal density of the shoot pack was 0.74 lb/ft$^2$ (3.61 kg/m$^2$). For testing against 9 mm FMJ bullet resistance, the shoot pack was mounted on a test frame filled with Plastilina #1 clay and strapped on the frame. The Plastilina filled frame was mounted at a 90-degree orientation to the line of fragment fired from a firmly mounted universal receiver. The 9 mm FMJ bullet used for testing conformed the shape, size and weight as per the National Institute of Justice (NIJ) 0101.04 test standard.

Ballistic testing was conducted in accordance with the procedures of MIL-STD-662F. Several 9 mm FMJ bullets were fired, changing the velocity of each one. The velocity of each 9 mm FMJ bullet was moved down and up depending upon whether the previous fragment shot was a complete penetration or partially penetrated a few layers of the shoot pack. An average velocity was achieved by including about four partial penetrations and about four complete bullet penetrations within a velocity spread of 125 fps. The average of partial and complete penetration velocities was calculated and called $V_{50}$. The $V_{50}$ of this shoot pack was tested as 1525 fps. The Specific Energy Absorption of the Target (SEAT) was calculated as 236.81 J-m$^2$/kg.

Example 4

Example 2 was repeated, but tested against a 9 mm FMJ bullet. The size of the shoot pack was 18"×18" (45.7 mm×45.7 mm). The areal density of the shoot pack was 0.43 lb/ft$^2$ (2.09 kg/m$^2$). Ballistic testing was conducted as in Example 3. The $V_{50}$ of this shoot pack was tested as 1272 fps. The Specific Energy Absorption of the Target (SEAT) was calculated as 284.46 J-m$^2$/kg. This example illustrates the superior ballistic resistant properties achieved with SPECTRAL® 1000, 1100 denier fabric having 11% matrix polymer compared to 21% as in Example 3.

Example 5 (Comparative)

A ballistic shoot pack was prepared by stacking together 27 fabric layers, each fabric layer being comprised of a consolidated network having two sheets of unidirectional, HMPE fibers impregnated with Kraton® polymer, cross-plied at right angles and laminated between two sheets of LLDPE film.

The HMPE fibers were SPECTRA® 1000, 1300 manufactured by Honeywell International, Inc. and had a tenacity of 36 g/denier and a tensile modulus of 1150 g/denier. Each fabric layer comprised 79% by weight of fiber based on the weight the fabric, and comprised 21% by weight of the matrix polymer based on the weight the fabric. The LLDPE films each had a thickness of 9 µm. The areal density of the LLDPE film was 8 gsm. Total areal density of one fabric layer was 150.0 gsm. The laminated sheets of material had a thickness of 0.1651 mm.

The size of the shoot pack was 18"×18" (45.7 mm×45.7 mm). The stacks of 27 sheets were not connected with each other. The areal density of the shoot pack was 0.84 lb/ft$^2$ (4.1 kg/m$^2$). Fragment testing was conducted as in Example 1. The $V_{50}$ of this shoot pack was tested as 1501 fps. The Specific Energy Absorption of the Target (SEAT) was calculated as 27.86 J-m$^2$/kg.

Example 6

A ballistic shoot pack was prepared by stacking together 29 fabric layers of SPECTRA® 1000, 1300 as in Example 5. Each fabric layer comprised 92.9% by weight of fiber based on the weight the fabric layer, and comprised 7.1% by weight of matrix polymer based on the weight the fabric. The total areal density of one fabric layer was 129.0 gsm. The size of the shoot pack was 18"×18" (45.7 mm×45.7 mm). The stacks of sheets were not connected with each other. The areal density of the shoot pack was 0.77 lb/ft$^2$ (3.75 kg/m$^2$).

Fragment testing was conducted as in Example 1. The average of eight partial and complete penetration velocity was calculated and called $V_{50}$. The $V_{50}$ of this shoot pack was tested as 1660 fps. The Specific Energy Absorption of the Target (SEAT) was calculated as 37.12 J-m$^2$/kg. This example illustrates the superior fragment resistant properties achieved with SPECTRA® 1000, 1300 fabric having 7% matrix polymer compared to 21% as in Example 5.

Example 7

A ballistic shoot pack was prepared by stacking 28 fabric layers of SPECTRA® 1000, 1300 fibers as in Example 5. Each fabric layer comprised 89.9% by weight of fiber based on the weight the fabric layer, and comprised 10.1% by weight of the matrix polymer based on the weight the fabric layer. The total areal density of one fabric layer was 132.8 gsm. The size of the shoot pack was 18"×18" (45.7 mm×45.7 mm). The stacks of sheets were not connected with each other. The areal density of the shoot pack was 0.77 lb/ft² (3.75 kg/m²).

Fragment testing was conducted as in Example 1. The $V_{50}$ of this shoot pack was tested as 1616 fps. The Specific Energy Absorption of the Target (SEAT) was calculated as 35.73 J-m²/kg. This example illustrates the superior fragment resistant properties achieved with SPECTRA® 1000, 1300 fabric having 10% matrix polymer compared to 21% as in Example 5.

Example 7A

A ballistic shoot pack was prepared by stacking 29 fabric layers of SPECTRA® 1000, 1300 fibers as in Example 7. Each fabric layer comprised 85.0% by weight of fiber based on the weight the fabric layer, and comprised 15.0% by weight of the matrix polymer based on the weight the fabric layer. The areal density of the shoot pack was 0.83 lb/ft² (4.05 kg/m²).

Fragment testing was conducted as in Example 1. The $V_{50}$ of this shoot pack was tested as 1648 fps. The Specific Energy Absorption of the Target (SEAT) was calculated as 34.03 J-m²/kg. This example illustrates the superior fragment resistant properties achieved with SPECTRA® 1000, 1300 fabric having 15% matrix polymer compared to 21% as in Example 5.

Example 8 (Comparative)

Example 5 was repeated but tested against 9 mm FMJ bullet as in Example 3. The $V_{50}$ of this shoot pack was tested as 1450 fps. The Specific Energy Absorption of the Target (SEAT) was calculated as 189.22 J-m²/kg.

Example 9

Example 7 was repeated but tested against 9 mm FMJ bullet as in Example 3. Testing was conducted as in Example 3. The $V_{50}$ of this shoot pack was tested as 1519 fps. The Specific Energy Absorption of the Target (SEAT) was calculated as 226.54 J-m²/kg. This example illustrates the superior ballistic resistant properties achieved with SPECTRA® 1000, 1300 fabric having 10% matrix polymer compared to 21% as in Example 8.

The data collected from examples 1-9 is summarized in the following table:

| Example | Fiber, Denier (D) | % matrix polymer | % Fiber | Construction | Shoot Pack Areal Density (lb/ft²) | Shoot Pack Layers | Threat | $V_{50}$ (fps) | SEAT J-m²/kg |
|---------|-------------------|------------------|---------|--------------|-----------------------------------|-------------------|--------|----------------|--------------|
| 1 | Spectra® 1000, 1100 D | 21(*) | 79 | 4-ply | 0.43 | 18 | Fragment | 1201 | 34.88 |
| 1A | Spectra® 1000, 1100 D | 21(*) | 79 | 4-ply | 0.44 | 19 | Fragment | 1217 | 35.01 |
| 2 | Spectra® 1000, 1100 D | 11.3(*) | 88.7 | 4-ply | 0.43 | 20 | Fragment | 1412 | 48.2 |
| 3 | Spectra® 1000, 1100 D | 21(*) | 79 | 4-ply | 0.74 | 32 | 9 mm Bullet | 1525 | 236.81 |
| 4 | Spectra® 1000, 1100 D | 11.3(*) | 88.7 | 4-ply | 0.43 | 20 | 9 mm Bullet | 1272 | 284.46 |
| 5 | Spectra® 1000, 1300 D | 21(*) | 79.0 | 4-ply | 0.84 | 27 | Fragment | 1501 | 27.86 |
| 6 | Spectra® 1000, 1300 D | 7.1(*) | 92.9 | 4-ply | 0.77 | 29 | Fragment | 1660 | 37.12 |
| 7 | Spectra® 1000, 1300 D | 10.1(*) | 89.9 | 4-ply | 0.77 | 28 | Fragment | 1616 | 35.73 |
| 7A | Spectra® 1000, 1300 D | 15(*) | 85.0 | 4 ply | 0.83 | 29 | Fragment | 1648 | 34.03 |
| 8 | Spectra® 1000, 1300 D | 21(*) | 79.0 | 4-ply | 0.84 | 27 | 9 mm Bullet | 1450 | 189.22 |

-continued

| Example | Fiber, Denier (D) | % matrix polymer | % Fiber | Construction | Shoot Pack Areal Density (lb/ft²) | Shoot Pack Layers | Threat | $V_{50}$ (fps) | SEAT J-m²/kg |
|---|---|---|---|---|---|---|---|---|---|
| 9 | Spectra® 1000, 1300 D | 10.1(*) | 89.9 | 4-ply | 0.77 | 28 | 9 mm Bullet | 1519 | 226.54 |

(*)Kraton ® polymer with cyclohexane as solvent.
(**) Emulsion polymer polystyrene-polyisoprene-polystrene-block copolymer.
Shoot pack (target) size 18" × 18";
Areal density is weight of ballistic shoot pack as lbs/ft² (psf).
SEAT is Specific Energy Absorption of Target.

Examples 10-12

Three different samples of SPECTRA® Shield LCR were tested for peel strength properties, each sample having a different matrix polymer content. The SPECTRA® Shield LCR samples each comprised a four-layer structure of the following layering configuration: LLDPE film/0® fiber layer/90° fiber layer/LLDPE film. A standard peel strength test was conducted by peeling between the fiber layers. The results are summarized in the following table:

| EXAMPLE | Material | Fiber, Denier | % Matrix Polymer Content | Peel Strength (lbs./ft²) |
|---|---|---|---|---|
| 10 | SPECTRA® Shield LCR | Spectra® 1000, 1300 | 6.04% | 0.089 lbs. |
| 11 | SPECTRA® Shield LCR | Spectra® 1000, 1300 | 11.43% | 0.188 lbs. |
| 12 | SPECTRA® Shield LCR | Spectra® 1000, 1300 | 20.0% | 1.766 lbs. |

Examples 10-12 illustrate that the lower the matrix polymer content, the lower the bond strength. However, below a critical bond strength, the ballistic material loses durability during material cutting and assembly of articles, such as a vest, and also results in reduced long term durability of the articles. The sample from Example 10 having 6.04% matrix polymer content showed unacceptable peel strength at 0.089 lbs/ft². The sample from example 11 having 11.43% matrix polymer content showed good peel strength at 0.188 lbs/ft². This sample will also exhibit excellent fragment and ballistic performance. The sample from example 12 having 20.0% matrix polymer content shows strong peel strength at 1.766 lbs/ft², but the sample will exhibit only marginal fragment shielding performance. While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A fragment resistant material comprising:
    a) at least one consolidated network of fibers, said consolidated network of fibers comprising a plurality of cross-plied, non-woven fiber layers, each fiber layer comprising a plurality of fibers arranged in a substantially parallel array; said fibers having a tenacity of about 7 g/denier or more and a tensile modulus of about 150 g/denier or more; said fibers having an elastomeric matrix composition thereon, said elastomeric matrix composition substantially coating each of the individual fibers and comprising from about 7% to about 15% by weight of said consolidated network of fibers; the plurality of cross-plied, non-woven fiber layers being consolidated with said matrix composition to form said consolidated network of fibers; said consolidated network of fibers having anterior and posterior surfaces; wherein if said fibers comprise aramid fibers or poly (p-phenylenebenzobisoxazole) fibers, said matrix composition comprises at least about 11% by weight of said consolidated network of fibers; and
    b) at least one layer of a polymer film attached to each of said anterior and posterior surfaces of said consolidated network of fibers, wherein said polymer film layers comprise from about 2% to about 25% percent by weight of the overall material.

2. The fragment resistant material of claim 1 wherein said fibers comprise a material selected from the group consisting of extended chain polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, glass fibers and carbon fibers.

3. The fragment resistant material of claim 1 wherein said fibers comprise polyethylene fibers.

4. The fragment resistant material of claim 1 wherein the matrix composition comprises a material selected from the group consisting of polybutadiene, polyisoprene, natural rubber, ethylene-propylene copolymers, ethylene-propylene-diene terpolymers, polysulfide polymers, polyurethane elastomers, chiorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof.

5. The fragment resistant material of claim 1 wherein the matrix composition comprises polystyrene-polyisoprene-polystrene-block copolymer.

6. The fragment resistant material of claim 1 wherein said matrix composition comprises from about 7% to about 14% by weight of the consolidated network of fibers.

7. The fragment resistant material of claim 1 wherein said matrix composition comprises from about 7% to about 13% by weight of the consolidated network of fibers.

8. The fragment resistant material of claim 1 wherein said matrix composition comprises from about 7% to about 12% by weight of the consolidated network of fibers.

9. The fragment resistant material of claim 1 wherein said matrix composition consists essentially of from about 7% to about 11% by weight of the consolidated network of fibers.

10. The fragment resistant material of claim 1 wherein said matrix composition consists essentially of from about 11% to about 15% by weight of the consolidated network of fibers.

11. The fragment resistant material of claim I wherein said fibers comprise aramid fibers or poly(p-phenylenebenzobisoxazole) fibers, and said matrix composition comprises from about 11% to about 15% by weight of the consolidated network of fibers.

12. The fragment resistant material of claim 1 wherein said polymer film layers comprise a material selected from the group consisting of selected from the group consisting of polyolefins, polyamides, polyesters, polyurethanes, vinyl polymers, fluoropolymers and copolymers and combinations thereof.

13. The fragment resistant material of claim 1 wherein said polymer film layers comprise a linear low density polyethylene having a thickness of about 9 μm.

14. The fragment resistant material of claim 1 wherein each of said fiber layers are cross-plied at a 90° angle relative to the longitudinal fiber direction of each adjacent fiber layer.

15. A fragment resistant article incorporating a fragment resistant material, which fragment resistant material comprises:
   a) at least one consolidated network of fibers, said consolidated network of fibers comprising a plurality of cross-plied, non-woven fiber layers, each fiber layer comprising a plurality of fibers arranged in a substantially parallel array; said fibers having a tenacity of about 7 g/denier or more and a tensile modulus of about 150 g/denier or more; said fibers having an elastomeric matrix composition thereon, said elastomeric matrix composition substantially coating each of the individual fibers and comprising from about 7% to about 15% by weight of said consolidated network of fibers; the plurality of cross-plied, non-woven fiber layers being consolidated with said matrix composition to form said consolidated network of fibers; said consolidated network of fibers having anterior and posterior surfaces; wherein if said fibers comprise aramid fibers or poly (p-phenylenebenzobisoxazole) fibers, said matrix composition comprises at least about 11% by weight of said consolidated network of fibers; and
   b) at least one layer of a polymer film attached to each of said anterior and posterior surfaces of said consolidated network of fibers, wherein said polymer film layers comprise from about 2% to about 25% percent by weight of the overall material.

16. The fragment resistant article of claim 15 which comprises a plurality of consolidated networks of fibers assembled in a bonded array.

17. The fragment resistant article of claim 15 which comprises a plurality of consolidated networks of fibers assembled in a non-bonded array.

18. The fragment resistant article of claim 15 which comprises a garment having a plurality of consolidated networks of fibers adjoined thereto.

19. The fragment resistant article of claim 18 wherein said garment comprises a vest having said plurality of consolidated networks of fibers adjoined thereto.

20. The fragment resistant article of claim 15 wherein said matrix composition consists essentially of from about 7% to about 11% by weight of the consolidated network of fibers.

21. The fragment resistant article of claim 15 wherein said matrix composition consists essentially of from about 11% to about 15% by weight of the consolidated network of fibers.

22. The fragment resistant article of claim 15 wherein said fibers comprise aramid fibers or poly(p-phenylenebenzobisoxazole) fibers, and said matrix composition comprises from about 11% to about 15% by weight of the consolidated network of fibers.

23. A method of producing a fragment resistant material comprising:
   a) forming at least two fiber layers, each fiber layer being formed by arranging a plurality of fibers into a substantially parallel, unidirectional array; said fibers having a tenacity of about 7 g/denier or more and a tensile modulus of about 150 g/denier or more; said fibers having an elastomeric matrix composition applied thereon;
   b) arranging said fiber layers wherein the unidirectional array of fibers of each layer are cross-plied at a non-parallel angle relative to the longitudinal fiber direction of each adjacent layer;
   c) bonding said cross-plied layers under conditions sufficient to form a consolidated network of fibers, the consolidated network of fibers having anterior and posterior surfaces; wherein said matrix composition substantially coats each of the individual fibers and comprises from about 7% to about 15% by weight of said consolidated network of fibers, and wherein if said fibers comprise aramid fibers or poly (p-phenylenebenzobisoxazole) fibers, said matrix composition comprises at least about 11% by weight of said consolidated network of fibers; and
   d) attaching at least one layer of a polymer film to each of said anterior and posterior surfaces of said consolidated network of fibers, wherein said polymer film layers comprise from about 2% to about 25% percent by weight of the overall material.

24. The method of claim 23 wherein said matrix composition consists essentially of from about 7% to about 11% by weight of the consolidated network of fibers.

25. The method of claim 23 wherein said matrix composition consists essentially of from about 11% to about 15% by weight of the consolidated network of fibers.

26. The method of claim 23 wherein said fibers comprise aramid fibers or poly(p-phenylenebenzobisoxazole) fibers, and said matrix composition comprises from about 11% to about 15% by weight of the consolidated network of fibers.

27. The method of claim 23 wherein each of said fiber layers are cross-plied at a 90° angle relative to the longitudinal fiber direction of each adjacent fiber layer.

28. A fragment resistant material comprising:
   a) at least one consolidated network of fibers, said consolidated network of fibers comprising a plurality of cross-plied fiber layers, each fiber layer comprising a plurality of fibers arranged in an array; said fibers having a tenacity of about 7 g/denier or more and a tensile modulus of about 150 g/denier or more; said fibers having an elastomeric matrix composition thereon, said elastomeric matrix composition substantially coating each of the individual fibers and comprising from about 7% to about 15% by weight of said consolidated network of fibers; the plurality of cross-plied fiber layers being consolidated with said matrix composition to form said consolidated network of fibers; said consolidated network of fibers having anterior and posterior surfaces; and b) at least one layer of a polymer film attached to each of said anterior and posterior surfaces of said consolidated network of fibers, wherein said polymer film layers comprise from about 2% to about 25% percent by weight of the overall material.

29. An article comprising the fragment resistant material of claim 28.

30. The fragment resistant material of claim 1 which has a peel strength of at least about 0.17 lb/ft$^2$.

31. The fragment resistant material of claim 10 which has a peel strength of at least about 0.206 lb/ft$^2$.

* * * * *